(12) United States Patent
Lee

(10) Patent No.: US 9,905,253 B1
(45) Date of Patent: Feb. 27, 2018

(54) C-SHAPED NEAR-FIELD TRANSDUCER INCLUDING A PEG FOR HEAT-ASSISTED MAGNETIC RECORDING DEVICE

(71) Applicant: Seagate Technology LLC, Cupertino, CA (US)

(72) Inventor: Tae-Woo Lee, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/430,961

(22) Filed: Feb. 13, 2017

Related U.S. Application Data

(60) Provisional application No. 62/301,412, filed on Feb. 29, 2016.

(51) Int. Cl.
| G11B 11/00 | (2006.01) |
| G11B 5/31 | (2006.01) |
| G11B 5/48 | (2006.01) |
| G11B 5/00 | (2006.01) |
| G11B 5/60 | (2006.01) |
| G11B 7/126 | (2012.01) |
| G11B 11/105 | (2006.01) |

(52) U.S. Cl.
CPC .......... G11B 5/3133 (2013.01); G11B 5/314 (2013.01); G11B 5/4866 (2013.01); *G11B 5/6088* (2013.01); *G11B 7/126* (2013.01); *G11B 11/1051* (2013.01); *G11B 11/10506* (2013.01); *G11B 2005/0021* (2013.01)

(58) Field of Classification Search
None
See application file for complete search history.

(56) References Cited

U.S. PATENT DOCUMENTS

| 7,796,353 | B2 | 9/2010 | Schabes et al. | |
| 7,852,587 | B2 | 12/2010 | Albrecht et al. | |
| 8,619,515 | B1 * | 12/2013 | Matsumoto | G11B 5/314 369/13.33 |
| 8,634,280 | B1 * | 1/2014 | Wang | G11B 5/3116 360/125.31 |
| 8,749,790 | B1 | 6/2014 | Tanner et al. | |
| 8,811,128 | B1 * | 8/2014 | Seigler | G11B 5/314 369/13.33 |
| 8,953,422 | B1 * | 2/2015 | Cao | G11B 5/4866 369/13.13 |
| 9,007,879 | B1 * | 4/2015 | Cao | G11B 5/314 369/13.33 |
| 9,053,722 | B1 * | 6/2015 | Burgos | G11B 5/3133 369/13.32 |
| 2010/0061018 | A1 | 3/2010 | Albrecht et al. | |
| 2010/0091618 | A1 | 4/2010 | Schabes et al. | |

(Continued)

*Primary Examiner* — Tan X Dinh
(74) *Attorney, Agent, or Firm* — Hollingsworth Davis, LLC

(57) ABSTRACT

An apparatus includes a near-field transducer (NFT) of a heat-assisted magnetic recording head. The NFT includes a substantially C-shaped portion and a peg portion extending from the substantially C-shaped portion. A planar member is disposed adjacent the NFT. The planar member includes a bottom surface configured to support surface plasmon polaritons (SPPs) that resonantly excite the NFT. A barrier member is installed within the planar member and is arranged to encompass at least a tip portion of the peg.

20 Claims, 7 Drawing Sheets

(56) References Cited

U.S. PATENT DOCUMENTS

| | | | | |
|---|---|---|---|---|
| 2012/0105996 | A1* | 5/2012 | Katine | G11B 5/314 369/13.33 |
| 2013/0064051 | A1* | 3/2013 | Peng | G11B 5/3133 369/13.33 |
| 2014/0313872 | A1* | 10/2014 | Rawat | G11B 13/045 369/13.33 |

* cited by examiner

# C-SHAPED NEAR-FIELD TRANSDUCER INCLUDING A PEG FOR HEAT-ASSISTED MAGNETIC RECORDING DEVICE

RELATED PATENT DOCUMENTS

This application claims the benefit of Provisional Patent Application Ser. No. 62/301,412 filed on Feb. 29, 2016, to which priority is claimed pursuant to 35 U.S.C. § 119(e), and which is incorporated herein by reference in its entirety.

SUMMARY

Embodiments described herein in involve an apparatus comprising a near-field transducer (NFT) of a heat-assisted magnetic recording head. The NFT comprises a substantially C-shaped portion and a peg portion extending from the substantially C-shaped portion. A planar member is disposed adjacent the NFT. The planar member comprises a bottom surface and is configured to support surface plasmon polaritons (SPPs) that resonantly excite the NFT. A barrier member is installed within the planar member and is arranged to encompass at least a tip portion of the peg.

Embodiments described herein involve a near-field transducer (NFT) of a heat-assisted magnetic recording head. The NFT comprises a substantially C-shaped portion and a peg portion extending from the substantially C-shaped portion. A planar member is disposed adjacent the NFT. The planar member comprises an SPP propagator portion. The planar member comprises a barrier member arranged to encompass at least a tip of the peg portion. The barrier member comprises a peg coupler portion. The peg coupler portion is separated from the SPP propagator portion by the barrier layer and is configured to couple the SPPs into the peg portion.

Embodiments described herein involve a method comprising delivering light to a near-field transducer (NFT) of a heat-assisted magnetic recording slider via a waveguide. The NFT comprises a substantially C-shaped base portion and a peg extending from the base portion. The method involves causing surface plasmon polaritons (SPPs) to propagate at a bottom surface of a planar member facing the NFT, the SPPs resonantly exciting the NFT. The SPPs are coupled to the peg via a peg coupler portion. The peg coupler portion is separated from a propagator portion of the planar member by a barrier layer. A surface plasmon-enhanced near-field radiation pattern is provided to heat a magnetic recording medium proximate a media-facing surface of the slider.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
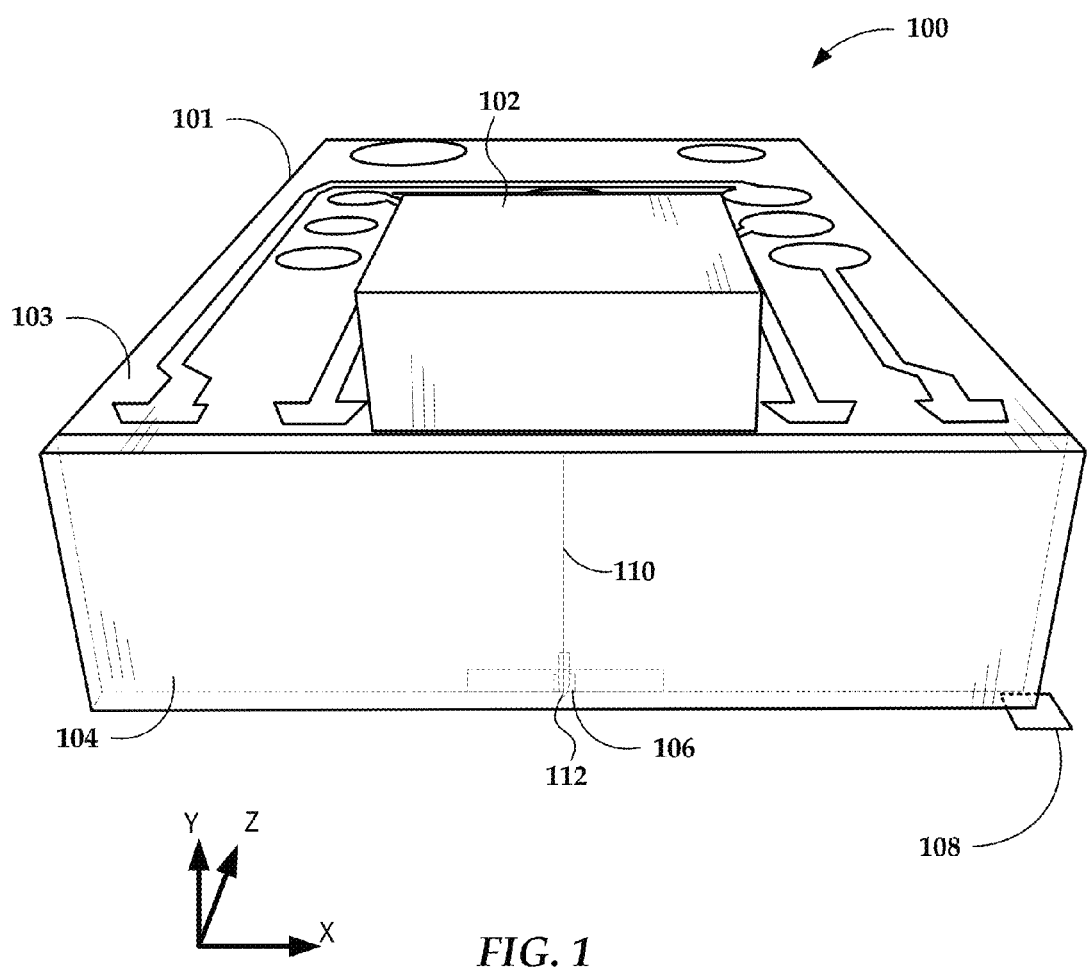
FIG. 1 illustrates a perspective view of a heat-assisted magnetic recording (HAMR) slider assembly according various embodiments described herein.

The present disclosure is generally directed to read-write heads used in magnetic recording devices such as hard drives. In particular, this disclosure relates to heat-assisted magnetic recording (HAMR), which can be used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider will also generally include a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region exceeding the Curie temperature having dimensions less than 100 nm (e.g., ~50 nm).

In heat-assisted magnetic recording (HAMR) employing a near-field transducer (NFT), a large thermal gradient (TG) is important in achieving a high linear density capability. In addition, reliability requirements demand that the choice of plasmonic metal have good mechanical strength, which is problematic for the better commonly-known plasmonic metals such as Au and Ag. In general, these two requirements (large TG and high reliability) work against each other, making it difficult achieve both at the same time. Embodiments described herein address this issue by achieving a high TG (e.g., higher that 10K/nm) by using a generally C-shaped NFT that incorporates a nanorod peg comprising a robust metal for peg pairing with isolated Au.

In reference to FIG. 1, a perspective view shows a HAMR slider assembly 100 according to an example embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components, such as a mode converting waveguide system 110, are formed integrally within the slider body 101 (near a trailing edge surface 104 in this example) and function as an optical path that delivers energy from the laser diode 102 to the recording media via a NFT 112. The NFT 112 is near the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
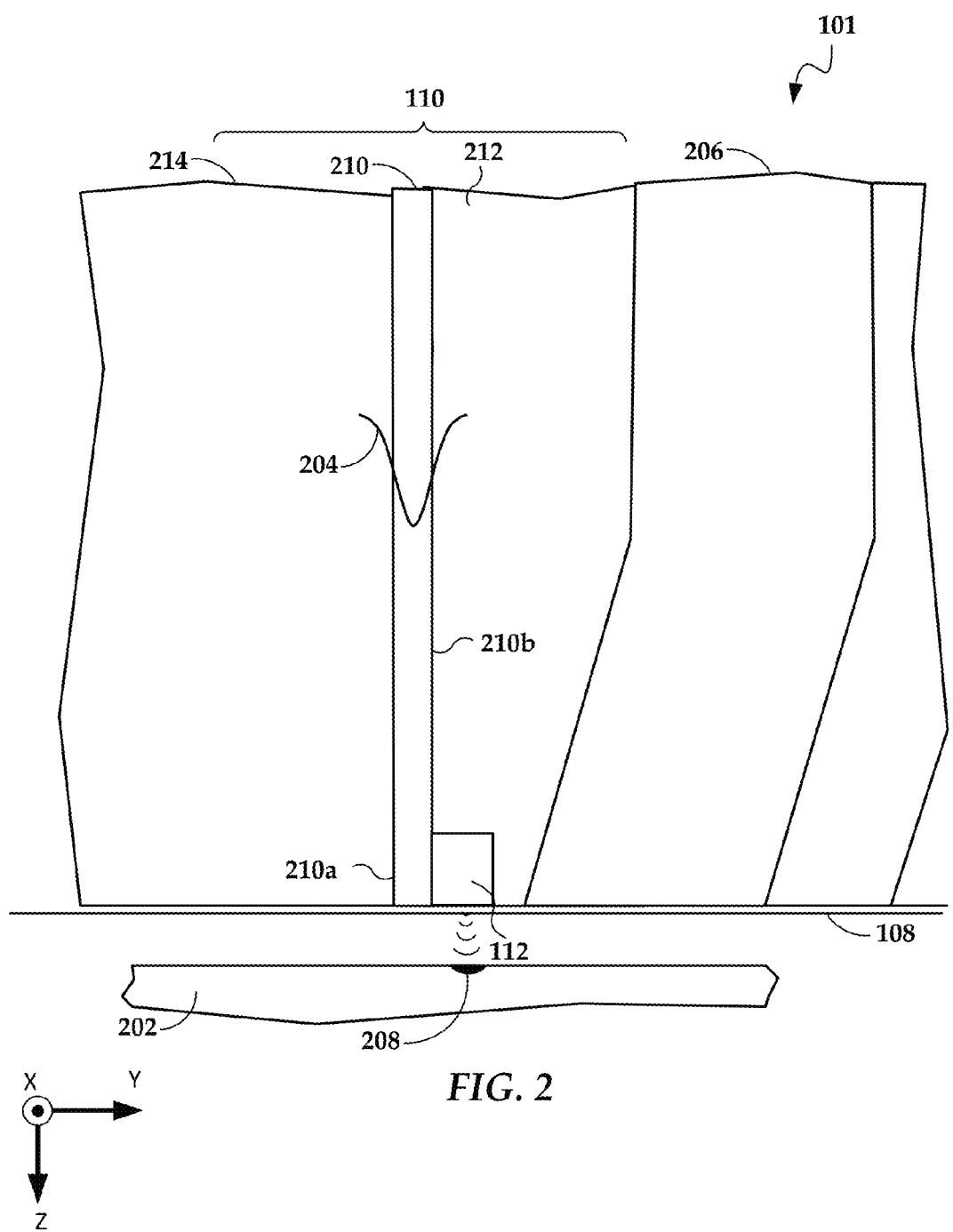
FIG. 2 shows a cross-sectional of portions of the slider body near the near-field transducer (NFT) according to various implementations.

In FIG. 2, a cross-sectional view illustrates portions of the slider body 101 near the NFT 112 according to an example embodiment. In this view, the NFT 112 is shown proximate to a surface of magnetic recording medium 202, e.g., a magnetic disk. The waveguide system 110 delivers electromagnetic energy 204 to the NFT 112, which directs the energy 204 to create a small hotspot 208 on the recording medium 202. A magnetic write pole 206 causes changes in magnetic flux near the media-facing surface 108 in response to an applied current. Flux from the write pole 206 changes a magnetic orientation of the hotspot 208 as it moves past the write pole 206 in the down track direction (y-direction). The slider body 101 moves over the recording medium in a cross-track direction (x-direction).

The waveguide system 110 includes a core layer 210 surrounded by cladding layers 212, 214. The core layer 210 and cladding layers 212, 214 may be made from dielectric materials such as $Al_2O_3$, $SiO_xN_y$, $SiO_2$, $Ta_2O_5$, $TiO_2$, ZnS, $SiN_x$, $Nb_2O_5$, AlN, $Hf_2O_3$, $Y_2O_3$, SiC, GaP, Si, etc. Generally, the dielectric materials are selected so that the refractive index of the core layer 210 is higher than refractive indices of the cladding layers 212, 214. This arrangement of materials facilitates efficient propagation of light through the waveguide system 110.

A first end of the core 210 (not shown) extends along the light propagation direction (z-direction) where it is directly or indirectly coupled to a light/energy source. For example, a laser diode may have an output facet that is coupled face-to-face with an end of the waveguide core 210. In other configurations, optical components such as lenses, mirrors, collimators, mode converters, etc., may be coupled between the waveguide core 210 and the light/energy source. In either case, the energy coupled into the first end of the waveguide core 210 propagates to a second end 210a that is proximate the NFT 112. In this configuration, the NFT 112 is located on a first side 210b of the waveguide core 210. According to various configurations, a heat sink (not shown) is proximate the NFT and is configured to sink head away from the NFT.

Figure 3:
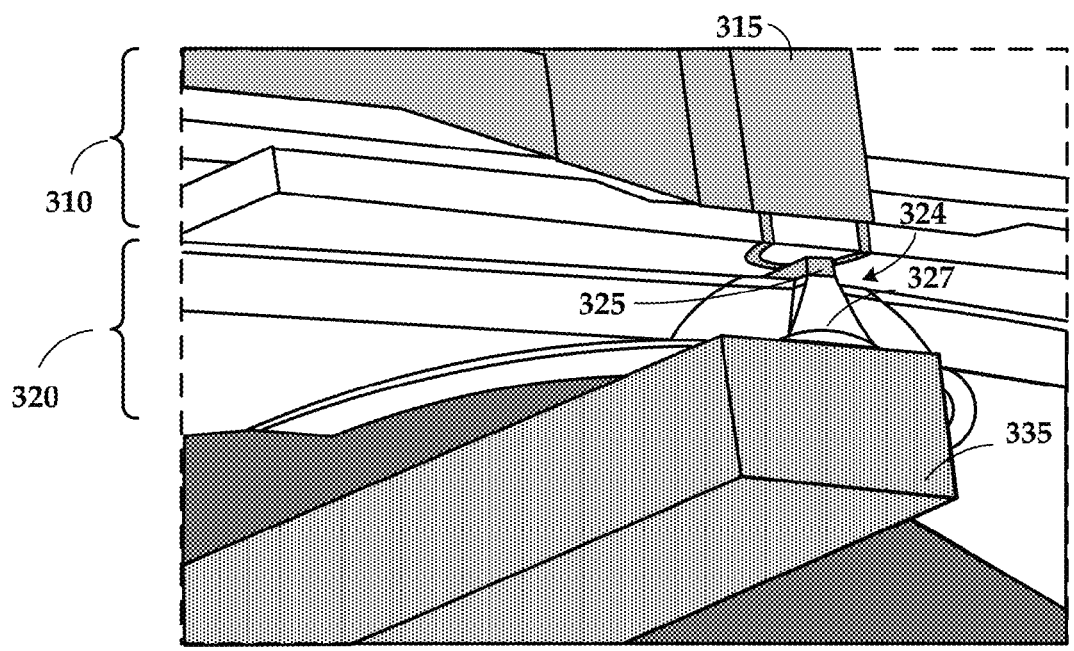
FIG. 3 illustrates another view of a slider body according to various embodiments.

FIG. 3 illustrates another view of the system described in conjunction with FIG. 2. The system comprises three portions. A top planar portion 310 is configured to be a surface plasmon polariton propagator (SPP) and a peg coupler. The top planar portion 310 may also include a write pole 315. A bottom portion 320 includes the NFT 324 including an NFT body 327 and a peg portion 325. The bottom portion 320 may also include a heat sink. A waveguide 335, such as a channel waveguide, is disposed proximate the bottom portion 320. According to various configurations, the top portion 310 is configured to facilitate SPP propagation along the bottom surface of the top portion 310. The SPPs are then collimated by the waveguide 335 under the NFT 324. The electric field generated at the NFT 324 is used as a heat source to generate a sharp and highly localized thermal spot in the magnetic media.

Figure 4A:
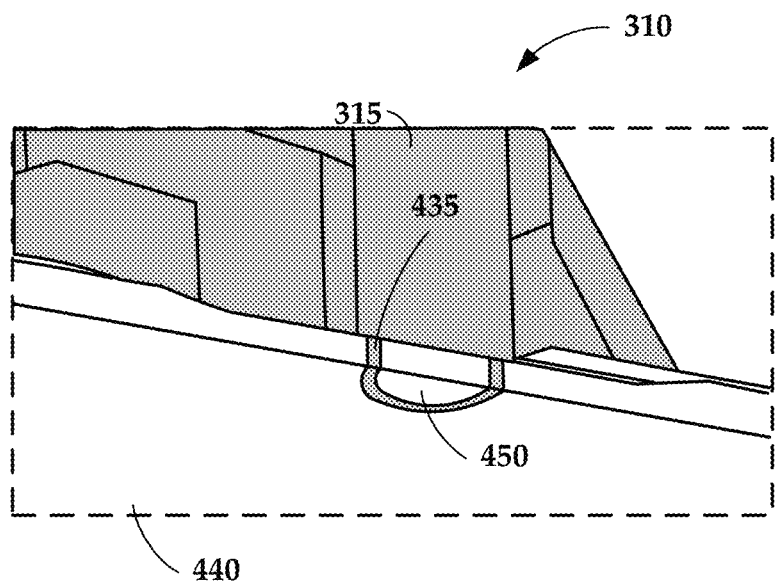
FIG. 4A shows a view of a top portion of a HAMR device including a surface plasmon polariton (SPP) propagator and a peg coupler in accordance with some aspects.

FIG. 4A shows a view of the top portion 310 of the device shown in FIG. 3. As described above, the top portion 310 includes the write pole 315 that is configured to change a magnetic orientation in regions of a magnetic recording media as the media moves underneath the write pole 315 in response to an energizing current applied to the write coil. An SPP propagator portion 440 is disposed proximate the write pole 315. A peg coupler portion 450 is configured to couple SPPs into the peg 430 of the bottom portion 320 (shown in FIG. 4B).

Due to the intensity of the laser light and the small size of an NFT, the NFT and surrounding material are subject to a significant rise in temperature during writing. Over time, this can affect the integrity and/or reliability of the NFT, for example, causing it to become misshapen or recess. A barrier layer 435 may be used to separate the peg coupler portion 450 from the SPP propagator portion 440. The barrier layer 435 may comprise Rh or Ir, for example. The barrier layer 435 may be configured to prevent a recess from forming in the peg coupler portion 450. According to various embodiments, the peg coupler portion 450 comprises Au.

Figure 4B:
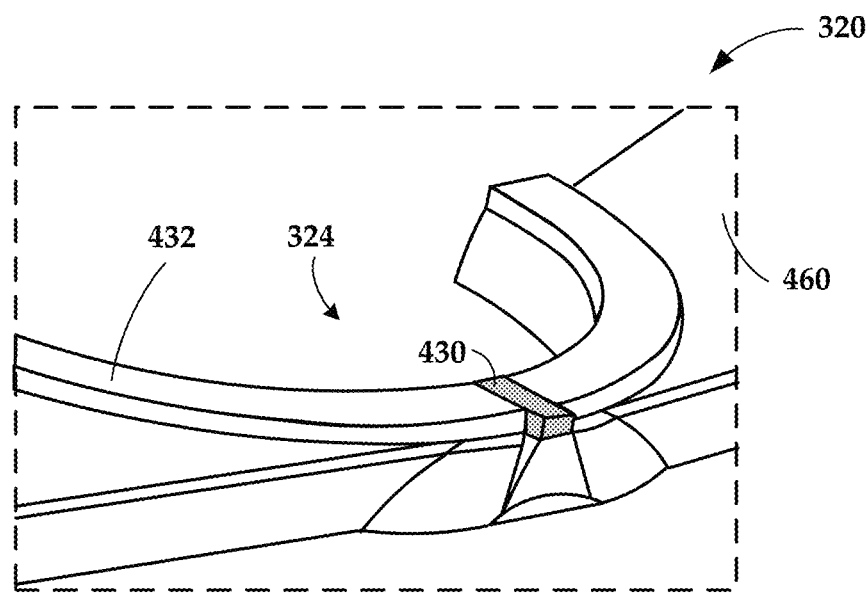
FIG. 4B illustrates a second portion of the device comprising an NFT portion and a heat sink according to various embodiments.

FIG. 4B illustrates the second portion of the device comprising the NFT portion and the heat sink. According to various implementations, the NFT 324 comprises a generally C-shaped base portion 460 in a top-down view and a nanorod peg 430 in the top (apex) of the C-shaped base portion 460. In some cases, the peg 430 is disposed at a location of the C-shaped base portion 460 other than the apex.

The top portion 310 shown in FIG. 4A may be separated from the bottom portion 320 shown in FIG. 4B by a nanometer-scale gap. For example, the top portion 310 may be separated from the bottom portion 320 by about 5 nm to about 50 nm. The peg portion 430 may extend at least partially through a central region of the C-shaped base portion 460. While, the base portion 460 is substantially C-shaped in this example, other topographically similar shapes may also be used.

One or more SPP suppression liners 432 may contact at least a portion of the top surface of the NFT body 460. The SPP suppression liners 432 may extend from both sides of the peg 430 and may be configured to reduce unwanted background media heating. In some cases, the SPP suppression liners 432 comprise a dielectric having a lower index of refraction (n) than the index of refraction of cladding dielectric 535. For example, the index of refraction of the suppression liners 432 may be in a range of about 1.3 to about 1.5.

The C-shaped base portion 460 may either be in direct contact with the peg portion 430 where the interface is abutted, overlapping the peg 430, and/or at least a portion of the peg portion 430 may be separated from the base portion 460 by some distance. The peg portion 430 may be a rod like structure, as described above, and/or it may contain geometrical structures that improve adhesion and plasmonic coupling. The amount of overlap between the peg portion 430 and the base portion 460, if present, may be chosen to advantageously affect efficiency, areal density capability, reliability, or any combination thereof.

Excessive, undesirable heating may be prevented or minimized by heat sinking the C-shaped base portion 460, the peg portion 430, or both using a heat sink. The heat sink may be made of the same or a different material than the peg 430, the base portion 460, or both. The heat sink may be separate from the base portion 460 and/or may be at least partially integrated with the base portion 460. The heat sink may have a contour/outline that follows that of the base portion 460 (C-shaped outline in this example, although another topographically similarly shaped base portion may be used) and extends from a major surface of the base portion 460 to the waveguide.

According to various implementations, the C-shaped base portion 460 and the peg portion 430 comprise different materials. For example, the C-shaped base portion 460 may comprise Cu, Au, Ag, Al, AlTi, ZrN, TiN or Ta. The peg portion 430 can be made of Au, Ag, Cu, ZrN, Ta, AlTi, Pd, Pt, Ni, Co, Ir, Rh, Al, alloys thereof, or combinations thereof. According to some embodiments, the peg portion 430 comprises Rh, Ir, Au, or another mechanically robust material. In some cases, the C-shaped base portion 460 of the NFT 324 and the peg portion 430 comprise different materials. The SPPs propagating along the bottom surface of the top portion 310 resonantly excite the NFT 324. As a result of the excitation of the NFT 324, an intense and localized near-field is produced by the peg 430 and delivered to the media proximate a media-facing surface of the slider.

Figure 5:
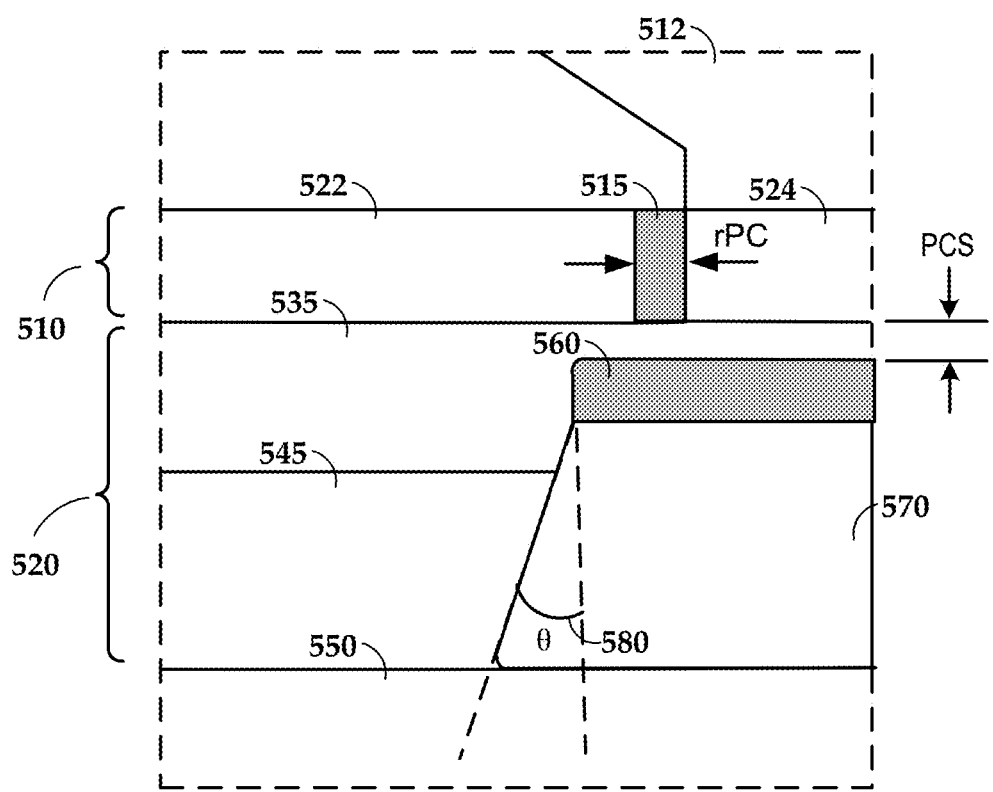
FIG. 5 illustrates a cross section of a storage device that comprises a C-shaped NFT in accordance with embodiments described herein.

FIG. 5 illustrates a cross section of a storage device that comprises a C-shaped NFT from the apex of the NFT. A write pole 512 is disposed proximate the SPP propagator portion 522 in the top portion 510 of the device. While FIG. 5 shows a sloped write pole, it is to be understood that any of the embodiments described herein may be implemented with a flat write pole. The top portion 510 includes a peg coupler portion 524. A barrier 515 is disposed between the SPP propagator 522 and the peg coupler portion 524. The barrier 515 comprise a material different than the SPP propagator 522. For example, the barrier 515 may include Rh. The width of the barrier (rPC) may be in a range of about 40 nm to about 160 nm, for example.

A bottom portion 520 is disposed proximate the top portion 510. The bottom portion 520 includes an NFT comprising a base portion 570 and a peg portion 560. According to various embodiments, the base portion 570 of the NFT is substantially C-shaped and/or the peg 560 is substantially rod-shaped. The spacing (PCS) between the peg 560 and the peg coupler portion 524 may have an impact on the thermal gradient. In some cases, the PCS is in a range of about 5 nm to about 40 nm. In some cases, the PCS is about 18 nm. Dielectric material 535, 545 continued from cladding material are disposed proximate the NFT. The base portion 570 may extend at an angle (θ) 580 as shown in FIG. According to carious embodiments, θ may be in a range of about 0 degrees to about 30 degrees, or about 0 degrees to about 24 degrees, for example. A waveguide 550 (e.g., channel waveguide) is disposed proximate the NFT.

Figure 6:
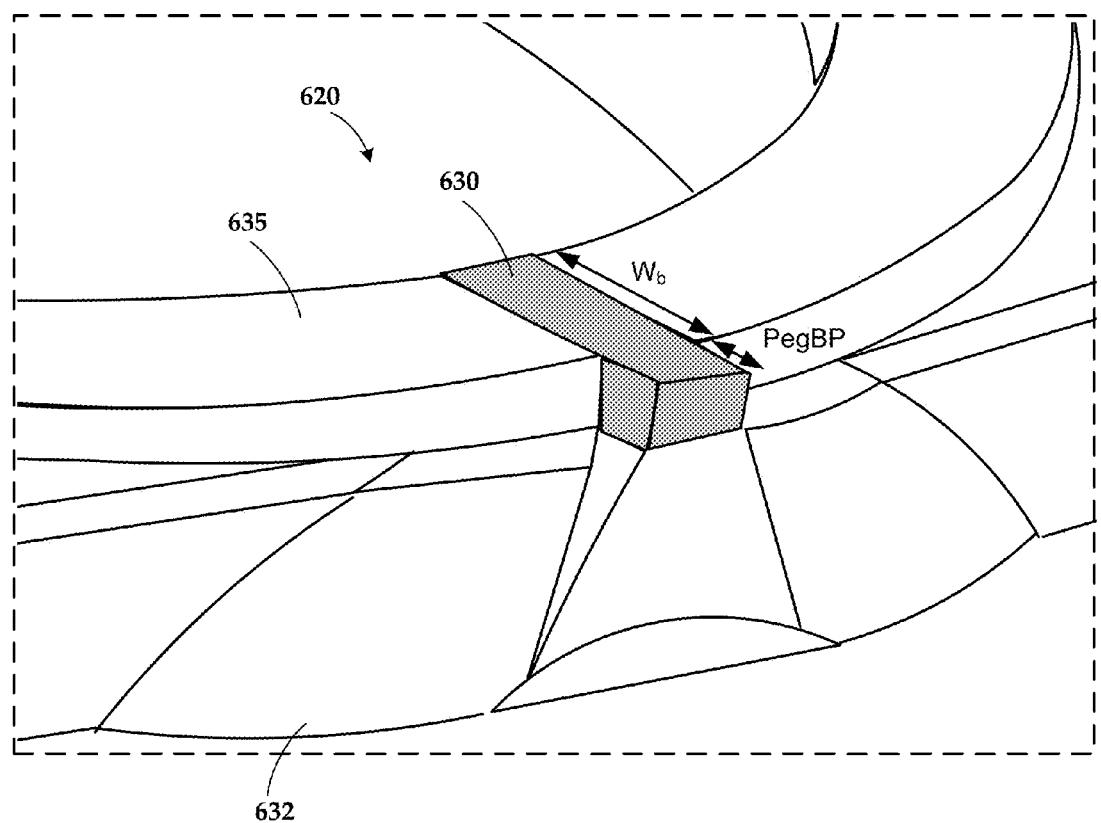
FIG. 6 illustrates a close-up view of the peg and the base portion of an NFT according to some embodiments.

FIG. 6 illustrates a close-up view of a peg portion 630 and a C-shaped base portion including SPP suppression liner 635 of an NFT 620 in accordance with various embodiments. The peg portion 630 may have various dimensions that have an impact on the thermal gradient. For example, the length of the peg portion 630 that is disposed adjacent to the base portion 632 ($W_b$) may be in a range of about 50 nm to about 150 nm. The length of the peg portion 630 that extends past the base portion 632 (PegBP) may be in a range of about 10 nm to about 50 nm, for example.

Figure 7:
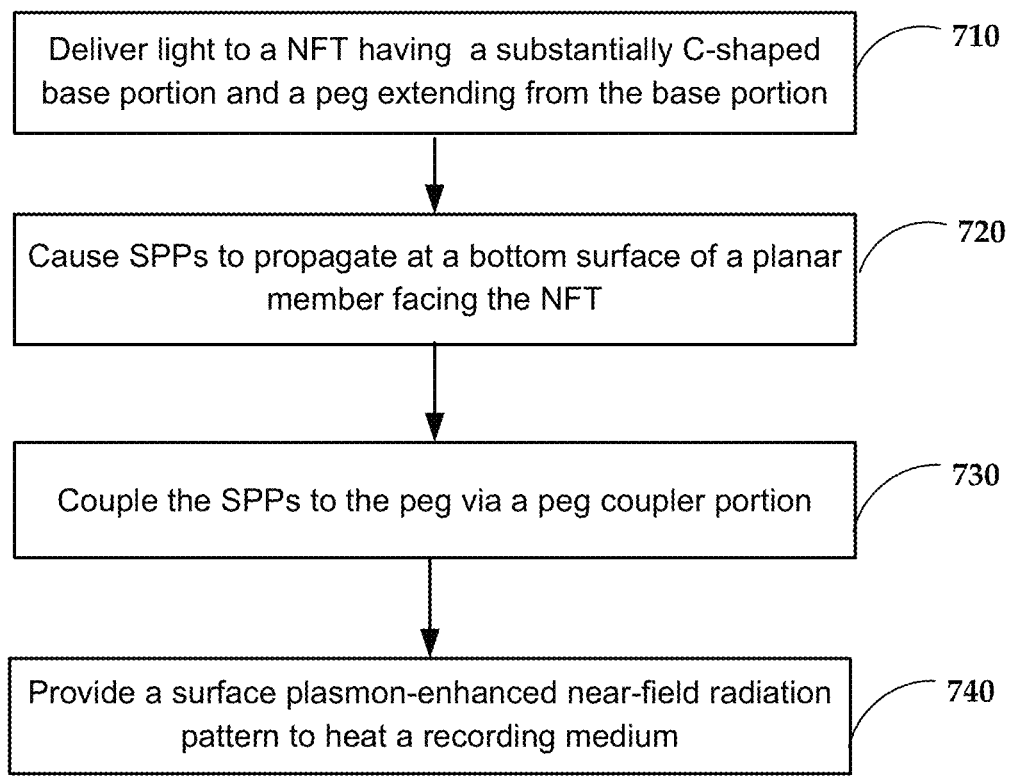
FIG. 7 illustrates a process for providing near-field radiation to a recording medium when using a HAMR device in accordance with embodiments described herein.

FIG. 7 illustrates a process for providing near-field radiation to a magnetic recording medium when using a HAMR device in accordance with embodiments described herein. Light is delivered 710 to an NFT of a HAMR slider via a waveguide. According to various implementations described herein, the NFT comprises a substantially C-shaped base portion and a peg extending from the base portion. The system causes 720 SPPs to propagate at a bottom surface of a planar member facing the NFT. The SPPs are configured to resonantly excite the NFT. The SPPs are coupled 730 to the peg via a peg coupler portion. According to various embodiments, the peg coupler portion is separated from a propagator portion of the planar member by a barrier layer. A surface plasmon-enhanced near-field radiation pattern is provided 740 to heat a magnetic recording medium proximate a media-facing surface of the slider.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus, comprising:
   a near-field transducer (NFT) of a heat-assisted magnetic recording head, comprising:
      a substantially C-shaped portion; and
      a peg portion extending from the substantially C-shaped portion;
   a planar member adjacent the NFT comprising a bottom surface configured to support surface plasmon polaritons (SPPs) that resonantly excite the NFT; and
   a barrier member installed within the planar member arranged to encompass at least a tip portion of the peg.

2. The apparatus of claim 1, further comprising a suppression liner disposed on a portion of the NFT and extending from both sides of the peg portion, the suppression liner comprising a low index dielectric.

3. The apparatus of claim 2, wherein the low index dielectric has an index n ranging between about 1.3 and 1.5.

4. The apparatus of claim 1, wherein the peg portion comprises at least one of Rh, Ir, and Au.

5. The apparatus of claim 1, wherein the barrier member comprises Rh.

6. The apparatus of claim 1, wherein the planar member comprises an SPP propagator portion and a peg coupler portion, the peg coupler portion separated from the SPP propagator portion by the barrier layer.

7. The apparatus of claim 6, wherein the peg coupler portion is configured to couple the SPPs into the peg portion.

8. The apparatus of claim 1, further comprising a heat sink, wherein the planar member is disposed adjacent a top surface of the NFT and the heat sink is disposed proximate a bottom surface of the NFT.

9. The apparatus of claim 1, wherein the substantially C-shaped portion and the peg portion comprise different materials.

10. A system, comprising:
    a near-field transducer (NFT) of a heat-assisted magnetic recording head, comprising:
       a substantially C-shaped portion; and
       a peg portion extending from the substantially C-shaped portion;
    a planar member adjacent the NFT comprising:
       an SPP propagator portion;
       a barrier member arranged to encompass at least a tip of the peg portion; and
       a peg coupler portion, the peg coupler portion separated from the SPP propagator portion by the barrier layer and configured to couple the SPPs into the peg portion.

11. The apparatus of claim 10, further comprising a suppression liner disposed on a portion of the NFT and extending from both sides of the peg portion, the suppression liner comprising a low index dielectric.

12. The apparatus of claim 11, wherein the low index dielectric has an index n ranging between about 1.3 and 1.5.

13. The apparatus of claim 10, wherein the peg portion comprises at least one of Rh, Ir, and Au.

14. The apparatus of claim 10, wherein the barrier member comprises Rh.

15. The apparatus of claim 10, wherein the peg coupler portion comprises Au.

16. The apparatus of claim 10, wherein the substantially C-shaped portion and the peg portion comprise different materials.

17. A method comprising:
    delivering light to a near-field transducer (NFT) of a heat-assisted magnetic recording slider via a waveguide, the NFT comprising a substantially C-shaped base portion and a peg extending from the base portion;
    causing surface plasmon polaritons (SPPs) to propagate at a bottom surface of a planar member facing the NFT, the SPPs resonantly exciting the NFT;
    coupling the SPPs to the peg via a peg coupler portion, the peg coupler portion separated from a propagator portion of the planar member by a barrier layer; and
    providing a surface plasmon-enhanced near-field radiation pattern to heat a magnetic recording medium proximate a media-facing surface of the slider.

18. The method of claim 17, further comprising sinking heat away from the NFT via a heat sink disposed proximate the NFT.

19. The method of claim 17, wherein the peg comprises at least one of Rh, Ir, and Au.

20. The method of claim 17, wherein the barrier member comprises Rh.

* * * * *